July 5, 1932.  L. E. LA BRIE  1,865,524

BRAKE ADJUSTING DEVICE

Original Filed Oct. 6, 1928

INVENTOR.
Ludger E. LaBrie
BY M. W. McConkey
ATTORNEY

Patented July 5, 1932

1,865,524

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE ADJUSTING DEVICE

Application filed October 6, 1928, Serial No. 310,837. Renewed November 2, 1931.

This invention relates to brakes, and is illustrated as embodied in an internal expanding brake for an automobile. An object of the invention is to provide a simple adjustment for the brake, preferably readily operable from outside the brake backing plate, and preferably adapted to operate an adjustment embodied in a novel floating joint connecting a pair of brake shoes.

In one desirable arrangement, the adjusting member of the joint is provided with a pinion meshing with an operating pinion which is preferably arranged at right angles thereto so that a part may extend through the backing plate for engagement with a wrench.

This type of adjustment is especially well adapted for use with the illustrated form of joint, which embodies substantial novelty in itself, and which includes an adjusting member threaded into one of two parallel transverse shoe pivots and seated in an unthreaded socket in the other. When the described adjustment is used with this joint, the operating pinion may most conveniently be mounted on one of the pivots.

The above and other objects and features of the invention, including various novel combinations of parts and desirable details of construction, will be apparent from the following description of the illustrative embodiment shown in the accompanying drawing, in which.

Figure 1:
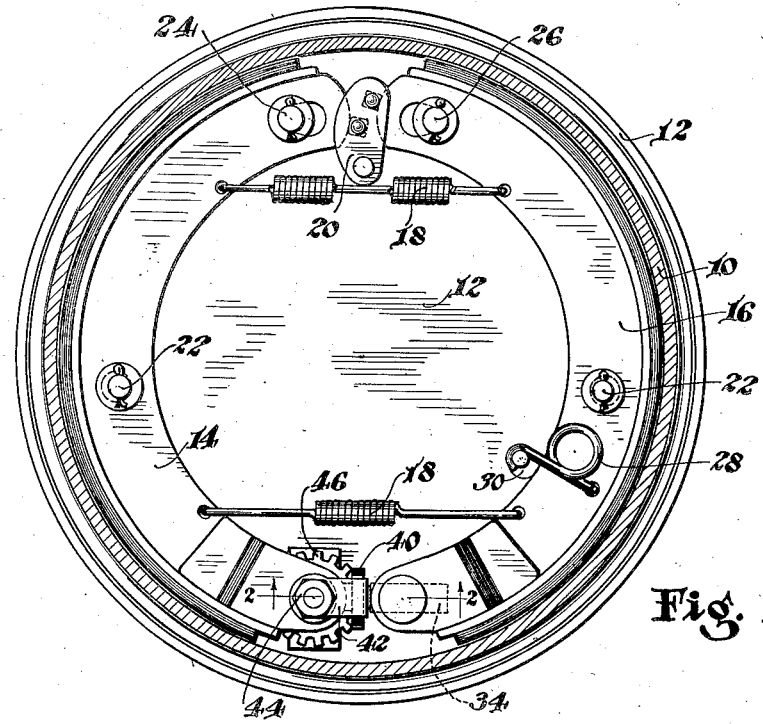
Figure 1 is a vertical section through the brake, just inside the head of the brake drum, and showing the brake shoes in side elevation.
Figure 2:
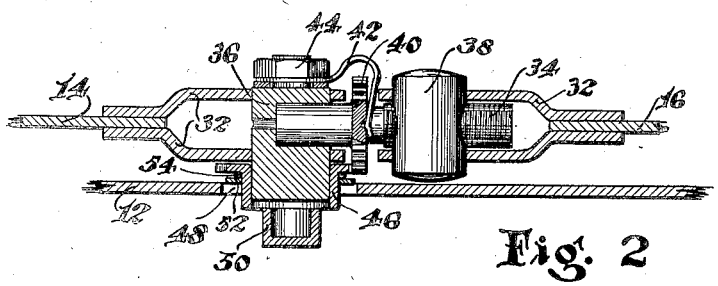
Figure 2 is a partial section on the line 2—2 of Figure 1, through the adjustment.
Figure 3:
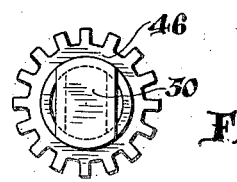
Figure 3 is an end elevation of the operating pinion.

The illustrated brake includes a rotatable drum 10, at the open side of which is a support such as a backing plate 12, and within which is arranged the friction means of the brake, shown as comprising two connected interchangeable floating shoes 14 and 16. The shoes are forced apart to apply the brake, against the resistance of return springs 18, by means such as a floating cam lever 20, the shoes having suitable steady rests or positioning devices 22. When the drum is turning clockwise (car moving backward) shoe 14 anchors on a fixed post 24, while when the drum is turning counter-clockwise (car moving forward) shoe 16 anchors on a fixed post 26. An auxiliary loop-shaped spring 28 urges shoe 16 toward an adjustable eccentric stop 30.

At their lower ends, shoes 14 and 16 are provided with plates 32 welded to their sides and pressed out to form sockets for the ends of an adjusting member 34, and having alined bearing openings sleeved on transverse pivots 36 and 38. One end of the adjusting member 34 is threaded into a tapped opening in the pivot 38, while the other end is smooth and is seated in an unthreaded socket in pivot 36. The lower spring 18 holds the adjusting member 34 seated in the socket in pivot 36. At its center, member 34 is formed with an adjusting pinion 40, with its teeth cut in its outer edge. The side of pinion 40 is formed with an annular series of depressions for interlocking engagement with a leaf spring or pawl 42 held by a nut 44 threaded on the end of pivot 36.

The adjusting mechanism includes an operating pinion 46 which is arranged at right angles to and meshing with the adjusting pinion 40. Pinion 46 is cup-shaped in form, and has a flange formed with the pinion teeth and projecting outwardly from a cylindrical bearing portion journaled on the end of pivot 36, and projecting through an opening 48 in the backing plate, the base of this portion being drawn out and distorted to form a non-circular portion 50 adapted to be gripped by a wrench to make the adjustments. The sides of portion 50 are severed from the base of the pinion body and pressed toward each other to form the flat wrench-engaging faces. A washer 52 sleeved on the bearing portion of the pinion, against a corrugated spring wire ring 54, substantially closes the opening 48.

While one illustrative embodiment has been described in detail, it is not my intention to limit the scope of the invention to that particular embodiment, or otherwise than by the terms of the appended claims.

I claim:

1. A brake having a floating joint including a pair of transverse pivots, a member having thrust engagement with one of the pivots and threaded engagement with the other pivot, an adjusting pinion on the member, and an operating pinion at right angles to and meshing with the adjusting pinion and floating with said joint.

2. A brake having a floating joint including a pair of pivots, a member having thrust engagement with one pivot and threaded engagement with the other pivot, an adjusting pinion on the member, and an operating pinion meshing with the adjusting pinion and floating with said joint.

3. A brake having a joint including a pair of transverse pivots, in combination with an adjusting member threaded into one of said pivots and having thrust engagement with the other and provided with an adjusting pinion, together with an operating pinion rotatably mounted on one of said pivots and meshing with the adjusting pinion.

4. A brake having a joint including a pair of transverse pivots, in combination with an adjusting member threaded into one of said pivots and having thrust engagement with the other and provided with an adjusting pinion, together with an operating pinion rotatably mounted on a part of said joint and meshing with the adjusting pinion.

5. A brake having a joint including a pair of transverse pivots, in combination with an adjusting member threaded into one of said pivots and having thrust engagement with the other and provided with an adjusting pinion.

6. An adjustable joint for brake shoes or the like comprising, in combination, parallel transverse shoe pivots, one of which has a threaded opening and the other of which has an unthreaded socket, an adjusting member having a threaded portion in said opening and an unthreaded portion seated in said socket, a pinion carried by said member, and an operating pinion at right angles to and meshing with said first pinion and which is rotatably mounted on the end of one of said pivots.

7. An adjustable joint for brake shoes or the like comprising, in combination, parallel transverse shoe pivots, one of which has a threaded opening and the other of which has an unthreaded socket, and an adjusting member having a threaded portion in said opening and an unthreaded portion seated in said socket.

8. An adjustable joint for brake shoes or the like comprising, in combination, parallel transverse shoe pivots, one of which has a threaded opening and the other of which has an unthreaded socket, and an adjusting member having a threaded portion in said opening and an unthreaded portion seated in said socket, a pinion carried by said member, and an operating pinion at right angles to and meshing with said first pinion and which is rotatably mounted on the end of the one of the pivots which has the unthreaded socket.

9. A shoe pivot having an unthreaded socket in its side, and provided with an adjustment-locking leaf spring at one end.

10. A shoe pivot having a socket in its side, and provided with an adjustment-locking spring at one end.

11. A pinion member formed as a drawn stamping with a cup-shaped bearing portion having an outwardly-projecting toothed flange and having its bottom drawn out and distorted to form a non-circular wrench-receiving portion.

12. A pinion member formed as a drawn stamping with a cup-shaped bearing portion having an outwardly-projecting toothed flange and having a non-circular wrench-receiving portion.

13. A floating brake adjustment including a pair of intermeshing spur gears, and a leaf spring serving as a pawl arranged in locking engagement with one of the gears.

14. A floating brake adjustment including a pair of intermeshing spur gears, a pivot carried by one of said gears, and a leaf spring carried by said pivot and serving as a pawl and arranged in locking engagement with one of the gears.

15. A brake comprising a drum, a backing plate, a pair of floating brake shoes arranged to anchor on one shoe when the drum is turning in one direction and on the other shoe when the drum is turning in the other direction, and an adjustable floating connection between the two shoes including intermeshing spur gears, one of which has an operating part accessible through an opening in the backing plate.

16. A brake comprising a drum, a backing plate, a pair of floating brake shoes arranged to anchor on one shoe when the drum is turning in one direction and on the other shoe when the drum is turning in the other direction, and an adjustable floating connection between the two shoes including a turn screw, a spur gear on the turn screw, and a spur gear in mesh with the gear on the turn screw having an operating part accessible through an opening in the backing plate.

17. A brake comprising shoes having pivots at their adjacent ends, adjustable means connecting said pivots, and a device mounted on one of said pivots and operable to manipulate said adjustable means.

18. A brake comprising shoes having pivots at their adjacent ends, adjusting means connecting said pivots, a spur gear mounted on one of said pivots and engaging the adjustable means.

19. A brake comprising shoes having pivots at their adjacent ends, an adjusting screw connecting the pivots, a spur gear on the adjusting screw, and a spur gear mounted on one of said pivots meshing with the spur gear on the adjusting screw.

In testimony whereof, I have hereunto signed my name.

LUDGER E. LA BRIE.